(12) United States Patent
Carlson et al.

(10) Patent No.: US 6,308,314 B1
(45) Date of Patent: Oct. 23, 2001

(54) MECHANISM AND METHOD FOR FLEXIBLE COUPLING OF PROCESSES IN AN OBJECT ORIENTED FRAMEWORK

(75) Inventors: Brent Allen Carlson; Timothy James Graser, both of Rochester, MN (US); Ulf Jesper Thomas Lindblom, Bromma; Torbjorn Pernbeck, Stockholm, both of (SE); Simon Paul Reason, Dunwoody, GA (US)

(73) Assignee: International Business Machines Corporation, New York, NY (US)

( * ) Notice: Subject to any disclaimer, the term of this patent is extended or adjusted under 35 U.S.C. 154(b) by 0 days.

(21) Appl. No.: 09/162,719

(22) Filed: Sep. 29, 1998

Related U.S. Application Data

(63) Continuation-in-part of application No. 09/038,024, filed on Mar. 11, 1998, now Pat. No. 6,106,569.

(51) Int. Cl.[7] .......................................................... G06F 9/45
(52) U.S. Cl. ................................................... 717/1; 717/11
(58) Field of Search ..................... 717/1, 11; 703/103 Y; 707/203; 709/310

(56) References Cited

U.S. PATENT DOCUMENTS

| | | | |
|---|---|---|---|
| 5,386,568 | * | 1/1995 | Wold et al. ............................ 395/700 |
| 6,038,590 | * | 3/2000 | Gish ....................................... 709/203 |
| 6,081,798 | * | 6/2000 | Johnson et al. ......................... 706/54 |

* cited by examiner

Primary Examiner—Mark R. Powell
Assistant Examiner—Wei Zhen

(74) *Attorney, Agent, or Firm*—Martin & Associates, LLC; Derek P. Martin

(57) ABSTRACT

In an object oriented computer system, a framework mechanism defines a mechanism that separates the ability to complete a process from the results of that process. A task is defined in the framework in terms of a sequence of processes. The framework includes a coupling mechanism for flexibly coupling any of these processes together in any suitable order to define the run-time behavior of the framework without changing the core functions of the framework. The coupling mechanism includes the definition of a processable interface and a processing interface. A particular process generally takes detail information as input and produces detail information that is used in a subsequent process. The detail information input into a process is said to be "processable", and therefore implements the "processable" interface. The detail information output from a process is said to be "processing" detail that is output to the next process, and therefore implements the processing interface. Thus, an object that uses "shippable" detail information as input through its processable interface generates corresponding "shipping" detail information for each shippable detail, which is output to one or more subsequent processes via the processing interface. A particular processable can be associated with any processing interface that supports the processable interface. In other words, any process-related class in the framework can be coupled to any other process-related class, provided one class has a processing interface that corresponds to the processable interface of the subsequent class. In this manner, classes in the framework mechanism can be flexibly coupled together in any suitable order or fashion to accommodate a great variety of different configurations. The framework mechanism therefore provides a high degree of implementation while maintaining the ability to achieve a high degree of customization.

10 Claims, 8 Drawing Sheets ively speed 55
MECHANISM AND METHOD FOR FLEXIBLE COUPLING OF PROCESSES IN AN OBJECT ORIENTED FRAMEWORK This application is a Continuation-In-Part of "A Method of Developing a Software System Using Object Oriented Technology", U.S. Ser. No. 09/038,024, filed Mar. 11, 1998, U.S. Pat. No. 6,106,569 which is incorporated herein by reference.

BACKGROUND OF THE INVENTION

1. Technical Field

This invention generally relates to object oriented programming and more specifically relates to a mechanism and method for coupling processes in an object oriented framework to create a desired processing environment.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object oriented programming is the "class." A class is a template that defines a type of object. A class outlines or describes the characteristics or makeup of objects that belong to that class. By defining a class, objects can be created that belong to the class without having to rewrite the entire definition for each new object. This feature of object oriented programming promotes the reusability of existing object definitions and promotes more efficient use of program code.

Frameworks are relatively recent developments in object oriented programming that provide a group of pre-packaged classes and class relationships that are designed to help a user easily extend the framework to write a particular software program, such as a software application. Frameworks typically define certain core functions that cannot be changed by a programmer using the framework, and allow the programmer to extend the framework at defined extension points to generate a custom software application in much less time than coding the software application from scratch.

The function of a software application can be thought of as a series of "processes". Some of these processes may have time-order dependence on other processes. For example, the output from one process may be used as the input to one or more subsequent processes. These processes may need to be combined in different ways depending upon the applicable rules for the particular software application and depending on the type of data being processed. A software application that is developed from scratch typically has the order of processes and their interrelationship hard-coded. A software application developed from most framework mechanisms has the order of processes and their interrelationship defined by some extent by the core functions of the framework, limiting the amount of customization available to a programmer who extends the framework.

Frameworks may be very general or can be a very specific solution to a particular problem. Framework developers typically make trade-offs between the number of functions the framework supports and the flexibility in using the framework. The more functions that are built into the core functions of the framework, the less time a programmer has to spend generating code to extend the framework. However, more functions generally mean a more detailed implementation within the framework itself, which typically reduces the ability to adapt the framework to different circumstances. Fewer core functions in the framework generally makes the framework more flexible, but decreases the power of the framework, putting more of a programming burden on the user that extends the framework to define a software application. Most frameworks try to balance performance with flexibility by defining core aspects of a specific problem within the framework, while allowing user customization of domain-specific information in the extensions to the framework. This approach can lead to a variety of different frameworks that are each targeted for specific types of software applications. For example, a framework for performing computer system diagnostics may have many different core functions than a framework for order processing. However, even a single type of application, such as order processing, can have a wide variety of different steps and orders of those steps that vary greatly according to the specific type of business and rules that the business has in place.

Examples of a few different types of order processing systems will illustrate the diversity of possible order processing systems. For a mail-order company that bills their customers after shipping the goods, the order processing may be represented at a high level by the following sequence of processes: 1) generate order; 2) pick order; 3) ship order; 4) generate invoice; and 5) confirm payment. A mail-order company that requires payment before shipping the goods may have a different order processing sequence: 1) generate order; 2) confirm payment; 3) generate invoice; 4) pick order; and 5) ship order. In this latter example, the generation of the invoice is done before the item is picked or shipped. A retail company typically has in-store stock, so the steps of picking and shipping the order are not required. Thus, the process steps and order of steps can vary greatly from one order processing system to the next. These examples serve to illustrate the point that virtually endless numbers and combinations of steps are possible in order processing, and in many other type of processing environments.

One solution to the wide array of possible combinations in order processing is to provide a framework that defines specific steps for a particular type of order processing. This solution would require three separate frameworks for the three order processing scenarios presented above. However, generating three separate frameworks for three different types of order processing essentially ignores the common features that exist in most order processing systems. Without a mechanism for allowing process steps to be flexibly coupled together in any desired order within a framework without changing core functions of the framework, the computer industry will continue to suffer from object oriented frameworks that are limited to a specific process flow for which they were specifically designed.

DISCLOSURE OF INVENTION

In an object oriented computer system, a framework mechanism defines a mechanism that separates the ability to complete a process from the results of that process. A task is defined in the framework in terms of a sequence of processes. The framework includes a coupling mechanism for flexibly coupling any of these processes together in any suitable order to define the run-time behavior of the framework without changing the core functions of the framework. The coupling mechanism includes the definition of a processable interface and a processing interface. A particular process generally takes detail information as input and produces detail information that is used in a subsequent process. The detail information input into a process is said to be "processable", and therefore implements the "processable" interface. The detail information output from a process is said to be "processing" detail that is output to the next process, and therefore implements the processing interface. Thus, an object that uses "shippable" detail information as input through its processable interface generates corresponding "shipping" detail information for each shippable detail, which is output to one or more subsequent processes via the processing interface. A particular processable can be associated with any processing interface that supports the processable interface. In other words, any process-related class in the framework can be coupled to any other process-related class, provided one class has a processing interface that corresponds to the processable interface of the subsequent class. In this manner, classes in the framework mechanism can be flexibly coupled together in any suitable order or fashion to accommodate a great variety of different configurations. The framework mechanism therefore provides a high degree of implementation while maintaining the ability to achieve a high degree of customization. This allows a single framework for order processing to be customized in a number of different ways by a user to define widely different order processing environments.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
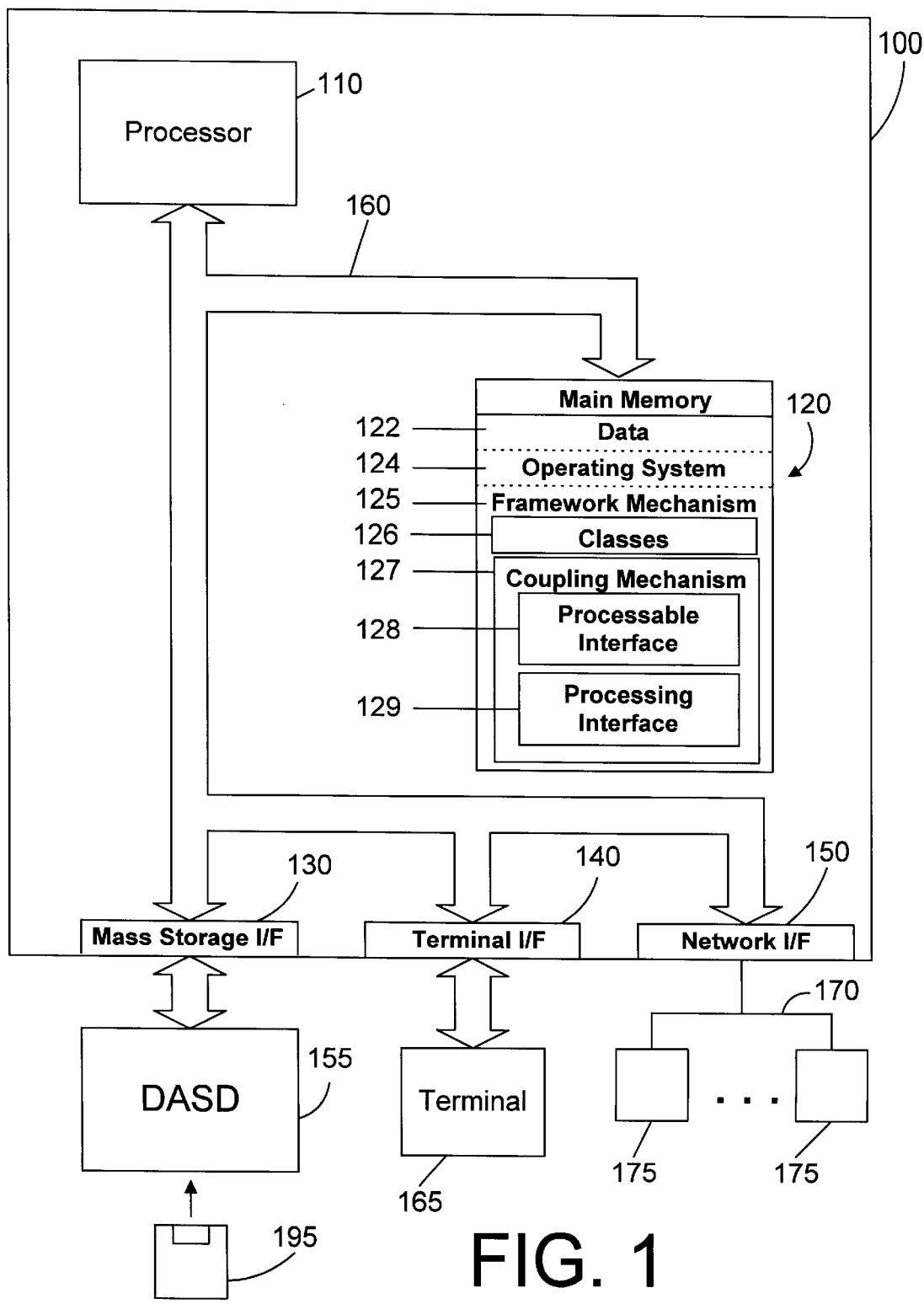
FIG. 1 is a block diagram of an apparatus in accordance with a preferred embodiment of the present invention.

The present invention is accomplished through the use of object oriented programming concepts. For those who are not familiar with object oriented programming concepts, the brief overview below provides background information that will help the reader to understand the present invention.

1. OVERVIEW

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is net to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

IBM's San Francisco Framework

IBM introduced a framework product known as "San Francisco" that provides a framework for programming business applications, such as a general ledger or order processing application. San Francisco provides a set of base services such as persistence and transaction support as well as a set of common business objects such as currency and business partner. Above the base layer, San Francisco provides frameworks that define the basis of an application such as a general ledger or order management with well defined extension points. A user may take advantage of the power and flexibility of San Francisco by providing user-defined extensions that customize San Francisco for a particular application. San Francisco thus provides a "short cut" to custom programming an entire application by providing pre-packaged code that is easily extended by a user to provide a custom application.

Extensible Items within IBM's San Francisco Framework

An important concept embodied in the San Francisco framework is the ability to separate mechanisms in the framework from domain-specific behavior. This is accomplished using dynamic run-time extensions that may be added to or deleted from an object to dynamically change the object's behavior. The extensions are objects that define interfaces that the extended object supports. Thus, the addition of an extension causes an object to support additional methods defined by those extensions, and the deletion of an extension causes an object to lose the support for the methods defined by the extension. An object may have a primary extension, and one or more additional extensions. An object with a primary extension logically becomes an object of the type defined by the primary extension. Thus, if an object has a primary extension OrderDetail, the object logically appears to be a member of the OrderDetail class. This ability to dynamically modify the behavior of objects at run-time is one of the powerful concepts supported in the San Francisco framework.

Figure 2:
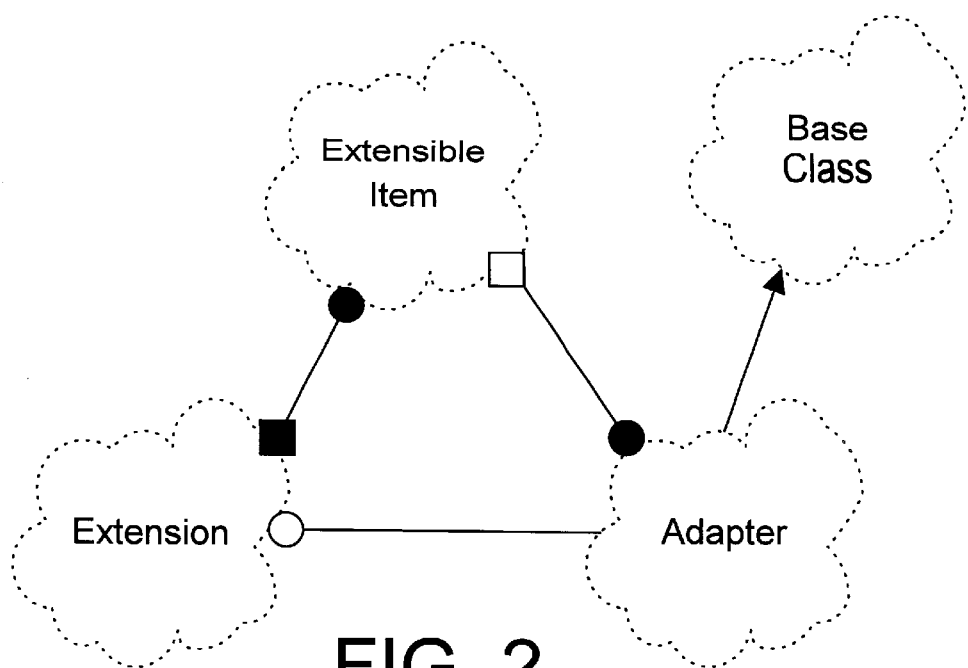
FIG. 2 is a class diagram of an extensible item and its related classes.

The class diagram of FIG. 2 illustrates the concept of dynamic run-time extensions in the San Francisco framework. An ExtensibleItem class represents a pure mechanism that is domain-neutral, i.e., that has no information (or need of information) that pertains to the specific domain in which an instance of ExtensibleItem is used. The ExtensibleItem class has a "has" relationship with an Extension class, which defines domain-specific run-time extensions that add functionality to an ExtensibleItem object that is required by the particular domain. This "has" relationship represents that each ExtensibleItem object may "own" one or more Extension objects. The Extension class has the ability to create or delete one or more adapter objects that are instances of an Adapter class. The Extension class has a "uses" relationship with the Adapter class, while the Adapter class has a "has" relationship with the ExtensibleItem class. The Adapter class inherits from a BaseClass that defines domain-specific behavior. The BaseClass defines a formal interface for the domain behavior that objects of the Extension class add to an ExtensibleItem object. The Adapter class is provided to allow an ExtensibleItem object owning an object of the given Extension class to be treated as a true instance of the BaseClass by making public methods implemented by the associated extension. Only methods defined by the Adapter class can be invoked.

Figure 3:
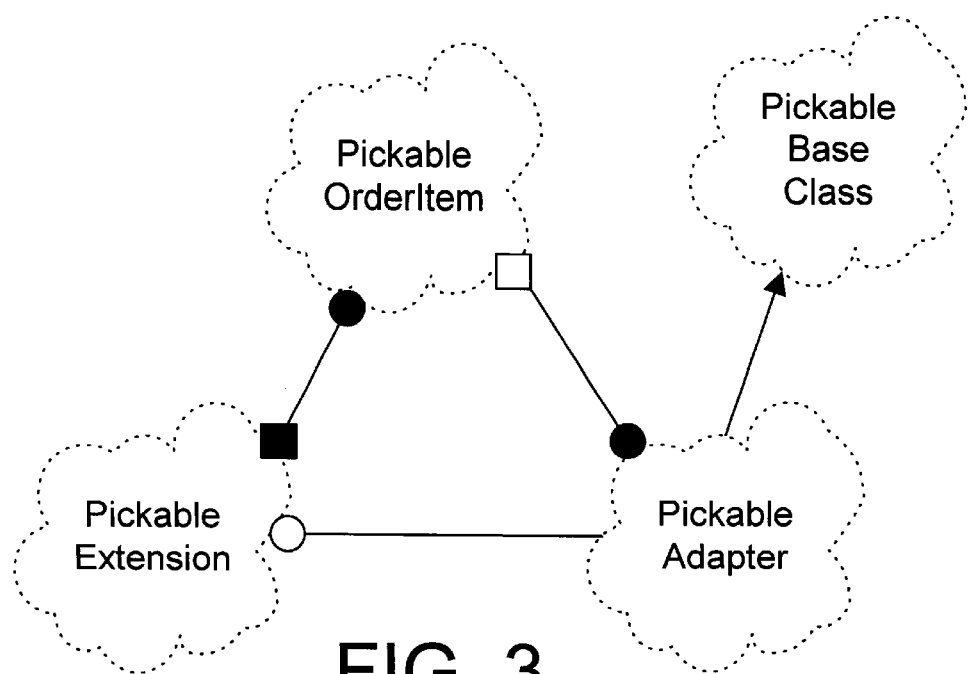
FIG. 3 is a class diagram of one specific example of an extensible item.

A specific example helps to illustrate the concepts of domain-specific extensions to a domain-neutral object. Let's assume there is a need for a "pickable" order item. Referring to FIG. 3, a PickableOrderItem class represents a domain-neutral extensible item, and includes an instance of a PickableExtension class, which extends the PickableOrderItem for use in a specific domain that requires objects that are pickable. A PickableAdapter class has a reference to the PickableOrderItem class, and supports the interface of the PickableBaseClass. The class configuration of FIG. 2, as illustrated in the specific example of FIG. 3, allows extensions to be dynamically added to and deleted from an extensible item object as the desired function of the object changes.

Figure 4:
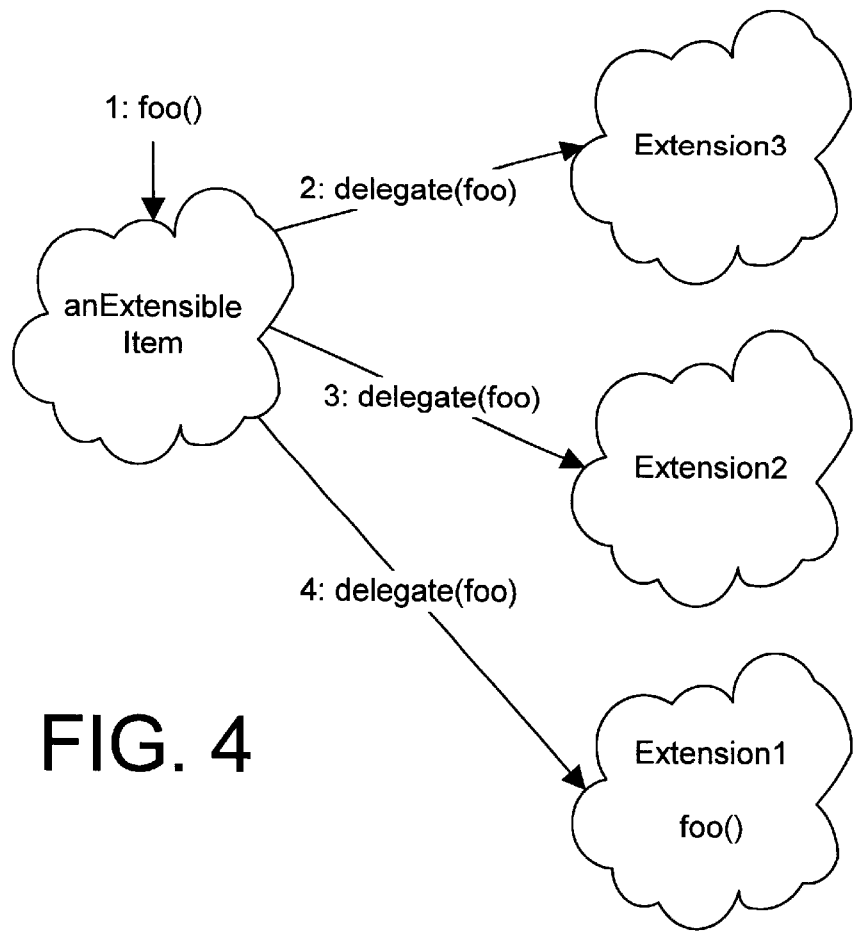
FIG. 4 is an object diagram illustrating the delegation of method calls to extension objects.

An instance of the ExtensibleItem class can service method calls in a number of different ways. Referring to FIG. 4, an instance anextensibleItem has three associated extensions, Extension3, Extension2, and Extension1. One way for an ExtensibleItem to service a method call is to determine which extension can handle the method call, progressing from the newest (Extension3) to the oldest (Extension1). For example, we assume that Extension1 supports a method called "foo", and that "foo" is invoked on an ExtensibleItem (step 1). The an ExtensibleItem object first delegates the "foo" method to Extension3 (step 2). Extension3 does not support the method, so an ExtensibleItem delegates the call to "foo" to the next extension, Extension2 (step 3). Extension2 does not support the "foo" method, so an ExtensibleItem delegates the call to "foo" to Extension1 (step 4). Extension1 supports "foo", so Extension1 executes its "foo" method in response to an ExtensibleItem delegating "foo" to Extension1 in step 4. Note that the first extension to support the "foo" method will execute its "foo", and other implementations of "foo" in older extensions are therefore not available. This is one way of hiding a method on existing extensions, by providing a newer extension that supports the method. In the alternative, an extension may change itself to fail when a specific method is requested, thereby hiding its own implementation of that method.

As the behavior of an ExtensibleItem is changed by adding or deleting extensions, the ExtensibleItem may have to interrogate several objects to determine the functions that it's interface supports, as shown in FIG. 4. If a method is not supported, the ExtensibleItem may spend a significant amount of processing time to make this determination. Likewise, if a method is implemented in an older interface, the ExtensibleItem may have to unsuccessfully interrogate several extensions before finding one that supports the called method. To improve performance, a Dynamic Virtual Function Table (DVFT) is used to cache the interface information on the ExtensibleItem in a dynamic way. Thus, when a method is invoked, the ExtensibleItem can determine from its Dynamic Virtual Function Table whether the method is supported, and if so, by what extension. The Dynamic Virtual Function Table thus improves system performance by caching interface information in the ExtensibleItem itself.

The information in the Dynamic Virtual Function Table may be maintained either as extensions are added to or removed from the ExtensibleItem, or may be built as the extensions are used. In the latter case, as a method call is delegated to an extension for the first time, its methods are added to the Dynamic Virtual Function Table. This solution is dynamic by maintaining cached information as the extensions are added and removed from the ExtensionItem.

Figure 5:
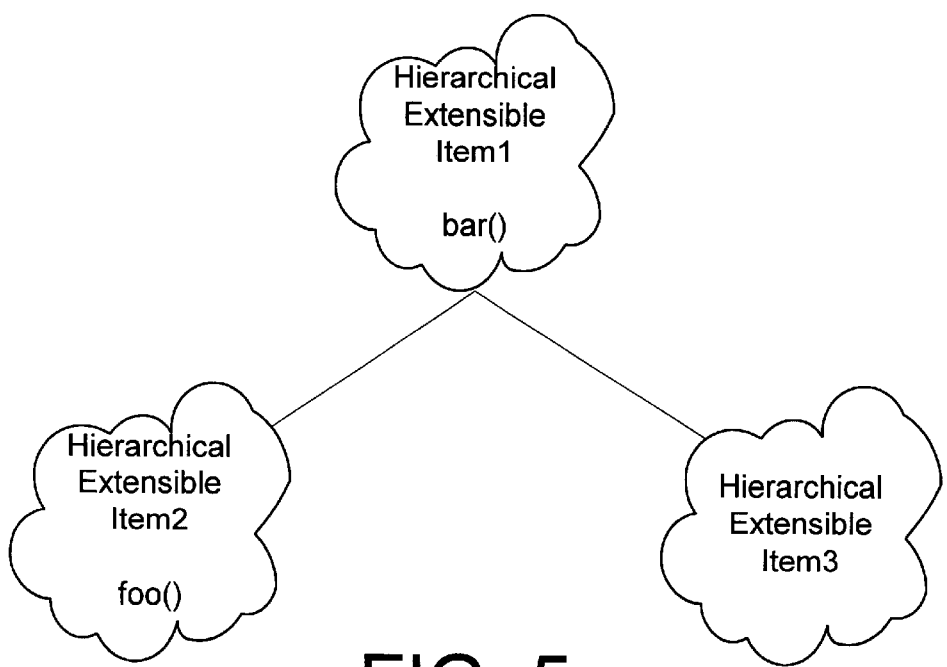
FIG. 5 is an object tree for illustrating the delegation of method calls to parent and children objects in an object tree.

If an ExtensibleItem object is part of a tree structure of objects, where it is attached to other ExtensibleItem objects as a parent and/or a child, the method call on one ExtensibleItem object may be delegated either upwards or downwards in the tree structure. For example, referring to FIG. 5, a very simple tree structure is provided to illustrate the delegation of method calls from one object in a tree structure to another. We assume that a class HierarchicalExtensibleItem is a subclass of ExtensibleItem that enhances ExtensibleItem by adding behavior to explicitly allow invoking methods in either a "drill up" or "drill down" fashion. HierarchicalExtensibleItem1 in FIG. 5 is an instance of the HierarchicalExtensibleItem class, and is at the top level of the tree, with two children objects HierarchicalExtensibleItem2 and HierarchicalExtensibleItem3 that are also instances of the HierarchicalExtensibleItem class. We assume that HierarchicalExtensibleItem1 supports the method "bar", and that HierarchicalExtensibleItem2 supports the method "foo". This means that these objects have one or more extensions that support these methods. In the case of "drill up", either method "foo" or "bar" could be invoked on HierarchicalExtensibleItem2. The invocation of the "foo" method on HierarchicalExtensibleItem2 delegates to the "foo" method on HierarchicalExtensibleItem2, while the invocation of "bar" delegates the "bar" up the tree (drill up) to HierarchicalExtensibleItem1. Invoking "foo" on HierarchicalExtensibleItem1 or HierarchicalExtensibleItem3 using "drill up" results in an error. When invoking a method using "drill down", if the method is found on a given HierarchicalExtensibleItem, the delegation will be to that method only, otherwise it will be invoked in "drill down" fashion (which may involve recursion) on all children of the given HierarchicalExtensibleItem, accumulating the results of the multiple method calls, if necessary. Thus, if "bar" is invoked on HierarchicalExtensibleItem1 using "drill down", it would delegate to the "bar" method on HierarchicalExtensibleItem1 and stop there. However, if "foo" were called on HierarchicalExtensibleItem1 using "drill down", the call would be delegated to "foo" on HierarchicalExtensibleItem2 and would then continue on to HierarchicalExtensibleItem3 (which would have no effect in the specific example of FIG. 5), and stop there. This concept of upwards and downwards delegation of method calls can be extended indefinitely throughout a tree structure of ExtensibleItems.

Extensible items thus provide a powerful and dynamic way to change the interface for an object at run-time so the object can acquire and tailor its domain-specific behavior as required. The concept of extensible items discussed above is the foundation upon which the present invention is built.

2. DETAILED DESCRIPTION

According to a preferred embodiment of the present invention, a mechanism and method provide for flexible coupling of processes in an object oriented framework without changing the core functions of the framework. Interfaces are provided that allow a class to be defined in a way that allows appropriate placement of the class relative to the other classes in the framework to achieve a desired processing environment from extending the framework.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, and an object oriented framework mechanism 125 in accordance with the preferred embodiments. Framework 125 includes multiple pre-defined classes 126, and a coupling mechanism 127 that defines a "processable" interface 128 and a "processing" interface 129. The "processing" and "processable" are abstract interfaces that are defined by a user and implemented by appropriate classes 126 within the framework 125 to achieve a coupling between classes that defines a desired processing environment. While the processable interface 128 and the processing interface 129 are shown in FIG. 1 as residing within the coupling mechanism according to the preferred embodiment, it is equally within the scope of the invention to have these interfaces defined separately from coupling mechanism 127.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, and framework mechanism 125 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Operating system 124 preferably supports an object oriented programming environment such as that provided, for example, by the Java programming language.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 6:
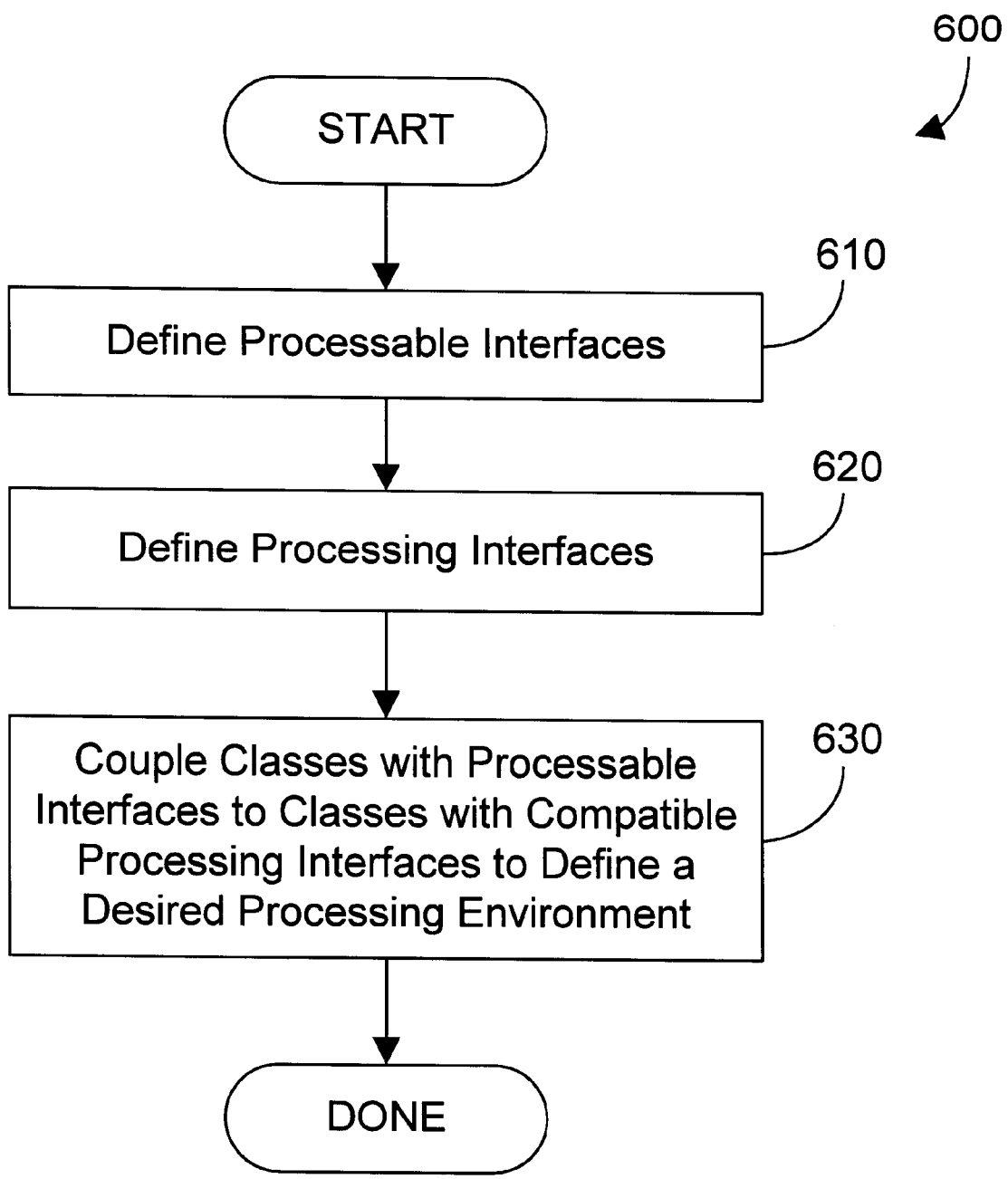
FIG. 6 is a flow diagram showing the steps in coupling processes within an object oriented framework mechanism in accordance with the preferred embodiments.

Referring to FIG. 6, a method 600 defines interfaces that allow flexible coupling of processes within the framework, and then couples the processes together in a particular configuration to achieve a desired processing environment in accordance with a preferred embodiment. The first step 610 in method 600 is to define one or more processable interfaces. The next step 620 is to define one or more processing interfaces. The final step 630 is to couple together classes that represent processes in the framework in a way that matches up the compatible processable and processing interfaces to achieve a desired processing environment.

Figure 7:
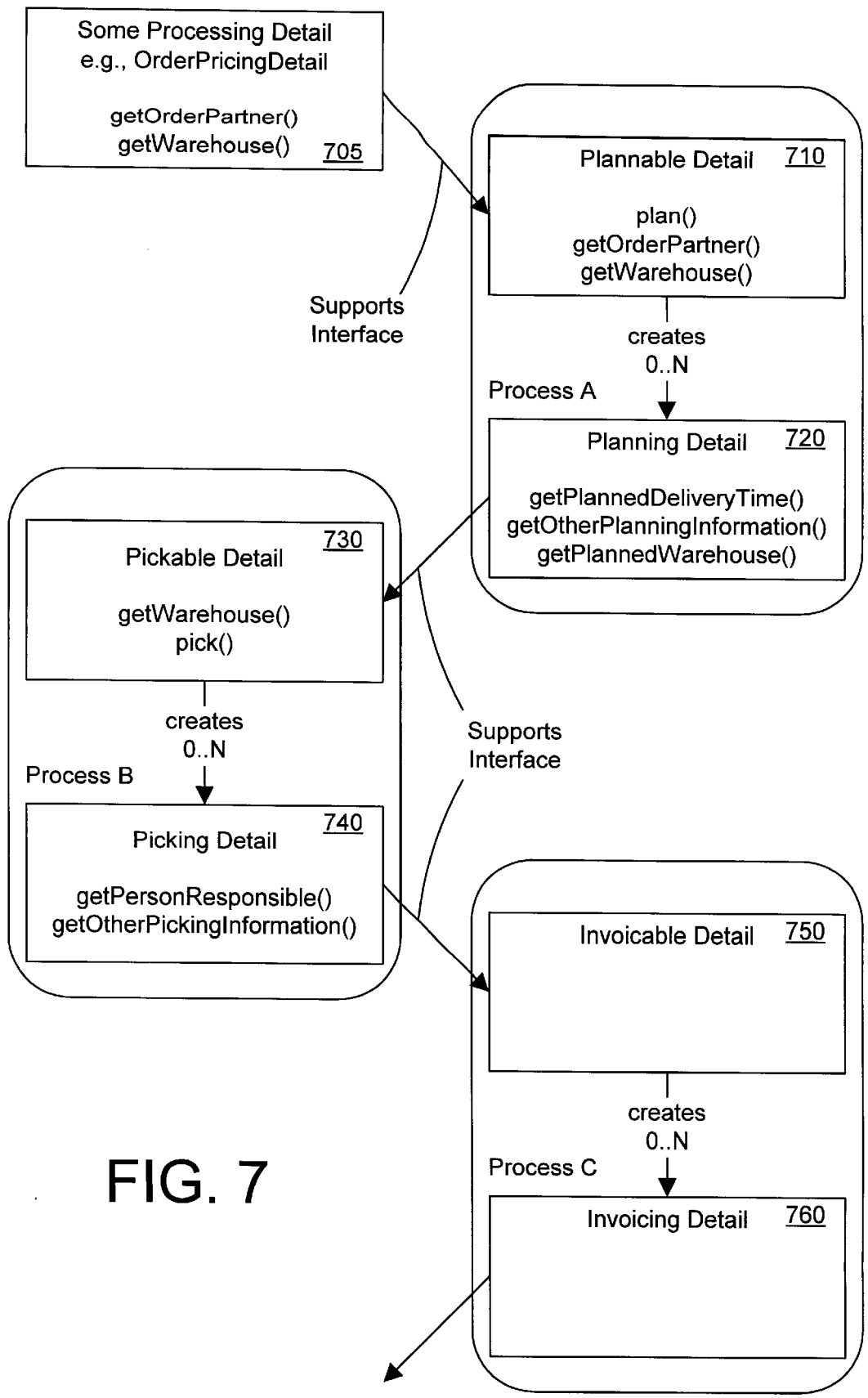
FIG. 7 is a diagram showing the coupling of three different processes in an order processing environment.

Referring to FIG. 7, a graphical depiction of method 600 of FIG. 6 will help illustrate the concepts of the present invention. For the specific example shown in FIG. 7, three processes A, B and C are shown, which correspond to classes 126 in framework 125 (FIG. 1). Process A is a planning process, process B is a picking process, and process C is an invoicing process. These processes correspond to processes commonly found in an order processing system. Process A defines a PlannableDetail interface 710 and a PlanningDetail interface 720, which are interfaces for performing the planning function. The PlannableDetail is the processable interface for process A, while the Planning-Detail is the processing interface for process A. In similar fashion, process B defines a PickableDetail interface 730 that is the processable interface for process B, and a PickingDetail interface 740, which is the processing interface for process B. Likewise, process C defines an InvoicableDetail interface 750 that is the processable interface for process C, along with an InvoicingDetail interface 760, which is the processing interface for process C. Note that there are other processes (not shown in FIG. 7) that precede process A and there may be other processes that come after process C.

The processable interface declares a process method for the corresponding process, and methods required by the process to implement its process method. For example, referring to FIG. 7, the PlannableDetail interface 710 declares the plan() process method and get methods for the attributes that the plan method requires, such as getOrderPartner() and getwarehouse(). Note that the process supported by a processable interface may be simply the direct creation of a processing detail. For example, a specific processable interface called OrderPriceDetailCreatable may declare a create() method that accepts the input parameters necessary to create an OrderPriceDetail, such as the product, requested quantity, and delivery time. Such "creatables" are processable interfaces that are suitably used to support an application's user interface, whereas other processable interfaces are used during the automated processing of the application.

The processing interface captures the results of the process method invoked on a processable interface and declares the methods that implementations of the processing interface must support. These methods are generally getter methods for domain information, as the processing is primarily historical data that was produced when the process method on its processable interface was invoked. For example, the PlanningDetail interface 710 of FIG. 7 declares methods getPlannedDeliveryTime(), getOtherPlanningInformation(), and getPlannedWarehouse().

The processable and processing interfaces for each process are defined so they are compatible with the corresponding interfaces in the processes that precede and follow a process. This allows a programmer using the framework to custom-configure the processes in any appropriate order by appropriately extending the framework without affecting the core function of the framework. Once appropriate processable and processing interfaces are provided for each process (steps 610 and 620 of FIG. 6), the processing interface of one process is coupled to the processable interface of the next process, thereby defining a desired processing environment (step 630 of FIG. 6). For the specific example of FIG. 7, a coupling mechanism in accordance with the present invention has custom-defined the order of the three processes A, B and C by implementing appropriate processable and processing interfaces for each of these processes, and by coupling these interfaces together in the order shown.

Providing separate processable and processing interfaces for each process allows the processes to be combined in any suitable manner. Each process in the framework runs without the knowledge of other processes in the system that have occurred before it, or may occur after it. Encapsulating each process in this manner allows the core functions of order processing to be defined by the framework without specifying in the core function of the framework a particular order for performing the processing steps. This capability allows a processing detail to support multiple processes in parallel. In other words, a picking detail could simultaneously become shippable and invoicable. In addition, a processing detail can support sequential processes, such as a picking detail first becoming shippable, then becoming invoicable.

Figure 8:
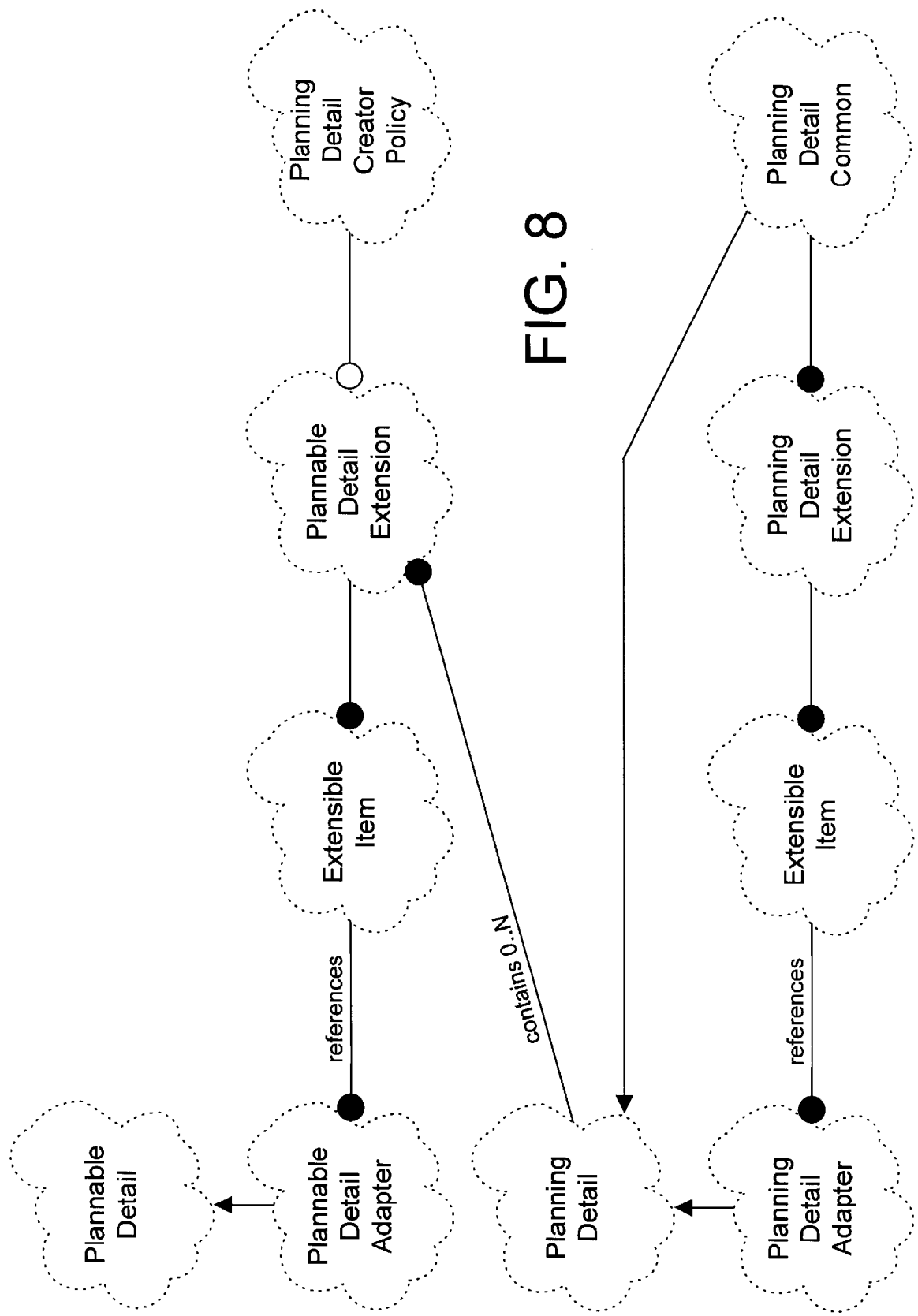
FIG. 8 is a class diagram showing the classes used to implement process A in FIG. 7.

Referring now to FIG. 8, a class diagram shows the various classes needed for the planning process (process A) of FIG. 7 in accordance with a preferred embodiment of the invention. PlannableDetailAdapter is a subclass of the PlannableDetail class, and references the ExtensibleItem class. The PlannableDetailAdapter allows an ExtensibleItem containing a PlannableDetailExtension to be treated directly as a PlannableDetail by clients and other framework processes. For example, the framework may support a "processPlannableDetails" process that specifically requires PlannableDetails as input. The PlannableDetailAdapter allows an ExtensibleItem containing a PlannableDetailExtension to be used as input to such a process.

The ExtensibleItem class contains one or more instances of the PlannableDetailExtension class. The PlannableDetailExtension class represents the dynamic run-time extensions to the ExtensibleItem class that make the ExtensibleItem behave in a domain-specific manner. PlannableDetailExtension has a using relationship with the PlanningDetailCreatorPolicy class, indicating that the PlannableDetailExtension creates a planning detail in accordance with the policy specified in the PlanningDetailCreatorPolicy.

The PlanningDetailCreatorPolicy is representative of policy classes that encapsulate algorithms that use the processable and processing interfaces wherever domain-specific logic will occur during processing. These encapsulated policies have methods that suitably take as an input parameter either the processable or the processing interface. Passing in interfaces makes it possible to implement the domain logic independently of the specific implementation of the processable and processing interfaces, thus introducing a great deal of flexibility into the design of the framework 125.

The process methods, such as plan(), should be implemented through the use of a specific creator policy that creates processing detail information from the process method. These creator policies have a general pattern. The processable interface whose process method was invoked passes itself to its designated creator policy. The creator policy creates a number of "common" objects based on domain rules and passes these "common" objects to the processable interface that invoked the policy via a callback method declared on the processable interface (such as createPlanningDetails). The callback is done to accommodate different implementations of a processing detail. Each implementation of a processable interface can choose how it wants to create processing details. The only restriction placed on the processable implementation is that the processing details it creates must support the processing interface.

Depending on domain rules, the callback method may be invoked more than once by the policy. For example, a policy may define a "now bit" and a "remaining bit", and make a first callback when one object is created that corresponds to the "now bit" and a second callback when a second object is created that corresponds to the "remaining bit", assuming that domain logic requires that each processing detail is dependent upon the previous processing detail.

The PlannableDetailExtension class contains O to N instances of the PlanningDetail class. PlanningDetailAdapter is a subclass of the PlanningDetail class, and references an ExtensibleItem class that contains one or more instances of the PlanningDetailExtension class. PlanningDetailExtension has a containing relationship with the PlanningDetailCommon class, indicating that the PlanningDetailExtension class invokes methods on the PlanningDetailCommon. A "common" class is provided as a concrete implementation of the processing interface, and is used to maintain common attributes for that processing interface. The common class provides a core implementation that typically will be encapsulated. For the specific example of FIG. 8, the PlanningDetailCommon class implements the PlanningDetail interface and contains the attributes that will be common to all implementations of PlanningDetail.

The processing/processable/common pattern illustrated in FIG. 8 may be repeated as necessary to achieve a layered structure. For example, a framework could provide two layers of partitioning, one at the warehouse management level and one at the order management level. This layering allows other implementations (such as manufacturing management) to reuse the portion of the structure provided by warehouse management without being forced to implement behavior that is useful only for order management.

Methods that are not directly implemented by a processable interface are related to attributes that would exist somewhere in the processing detail object hierarchy regardless of the presence of any processable interface. A processable extension may be placed on any processing detail as long as the processing detail or its parents or children support the aggregate set of methods declared on the processable interface. Details specific to a particular processing have no knowledge of the processes and associated processables that may depend upon those details.

The processable extension does not directly support some methods declared by the processable interface. Specifically, the extension supports the process method as well as methods and associated attributes that are meaningful only to its process. For example, referring to FIG. 7, notice that the PlannableDetail interface 710 supports the methods plan(), getRemainingUnplannedQuantity(), getOrderPartner(), and getwarehouse(). Notice also that the order processing detail 705 that feeds into PlannableDetail interface 710 introduces getOrderPartner() and getwarehouse() methods. In this example, the PlannableDetailExtension would only introduce the plan() and getRemainingUnplannedQuantity() methods and would expect the other two methods, getOrderPartner() and getwarehouse(), to be delegated to the extension representing the processing detail 705 that it has been attached to. This is shown graphically in the class diagram of FIG. 9.

Note that many processes need to change behavior according to a pre-defined lifecycle for the process that is defined by the processing environment. The ExtensibleItem class represents a class of objects that may be subclassed to define lifecycle managed objects. A life-cycle managed object has a corresponding LifeCycle object that defines its life cycle. As explained in the Overview section with reference to FIGS. 2–5, an ExtensibleItem (and hence, a life-cycle managed object through subclassing) allows dynamic changes to its behavior by dynamically adding or deleting extensions. Thus, as a life-cycle managed object progresses through its life cycle defined by the LifeCycle object, the behavior of the life-cycle managed object may be changed by invoking special methods known as mutator methods that cause extensions to the life-cycle managed object to be added, deleted, or modified via a mechanism described at below.

Both processable and processing extensions may add conditions to their containing life-cycle managed object whenever a mutator method is invoked to signal to the LifeCycle that the life-cycle managed object needs to be changed to reflect a different life cycle state. This allows the framework to complete whatever processing and state transitions that are necessary on the life-cycle managed object before changing the behavior of the life-cycle managed object. One significant aspect of these state transitions is the enabling and disabling of processables on a particular processing detail. For example, if a particular order type specifies that a picking detail should become first shippable and then Invoicable, the LifeCycle associated with that picking detail may add a shippable extension to the life-cycle managed object representing the picking detail when the detail is created. When the ship() method is invoked, the ship() method adds a condition to the life-cycle managed object. The LifeCycle then inspects this condition and determines that it must remove the shippable extension from the life-cycle managed object and add the Invoicable extension to the life-cycle managed object. In a different example, if a particular order type specifies that a picking detail may become simultaneously shippable and invoicable, the LifeCycle associated with that picking detail may simultaneously add a shippable and invoicable extension to the life-cycle managed object representing the picking detail when the detail is created.

Figure 9:
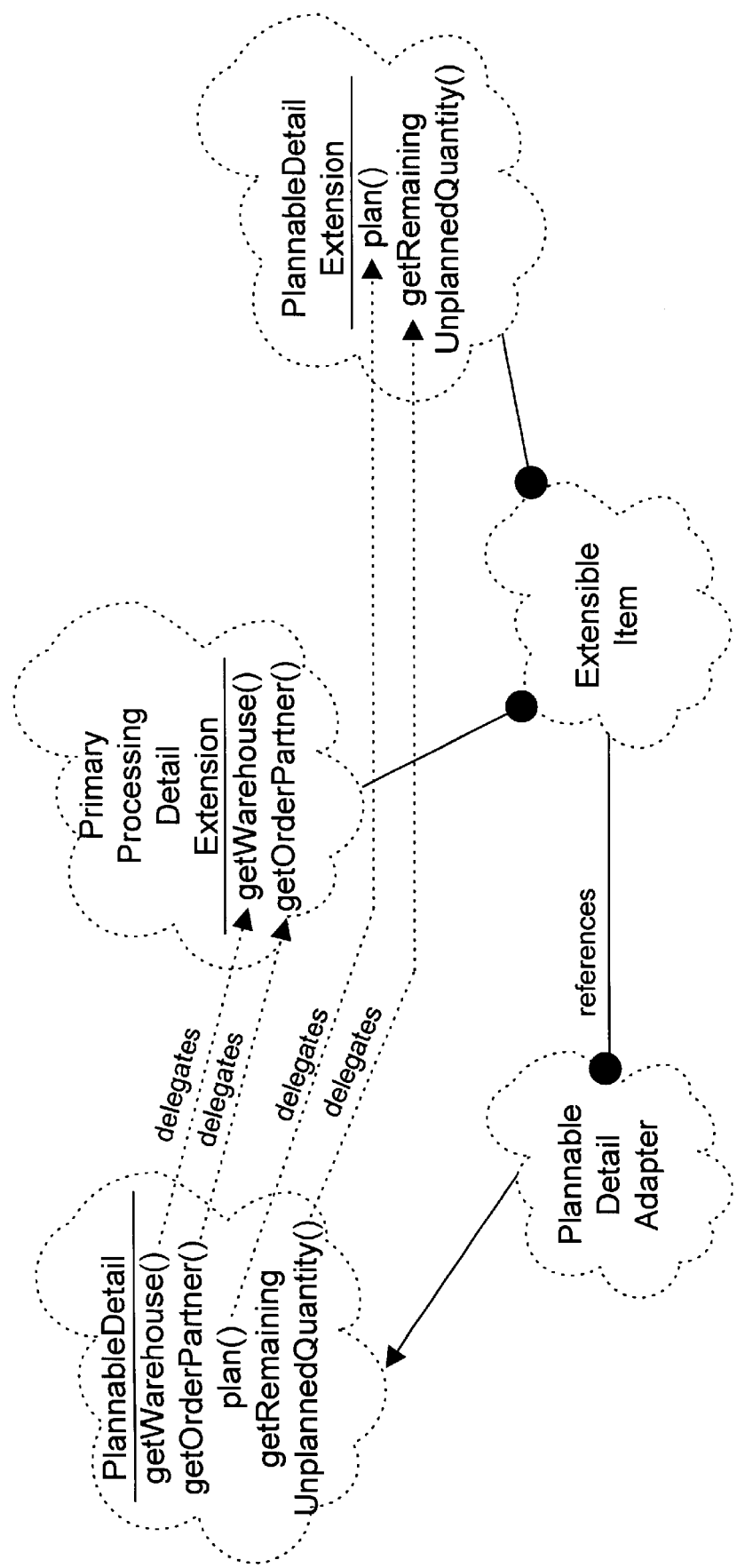
FIG. 9 is a class diagram showing the delegation of methods by the plannable detail class.
Figure 10:
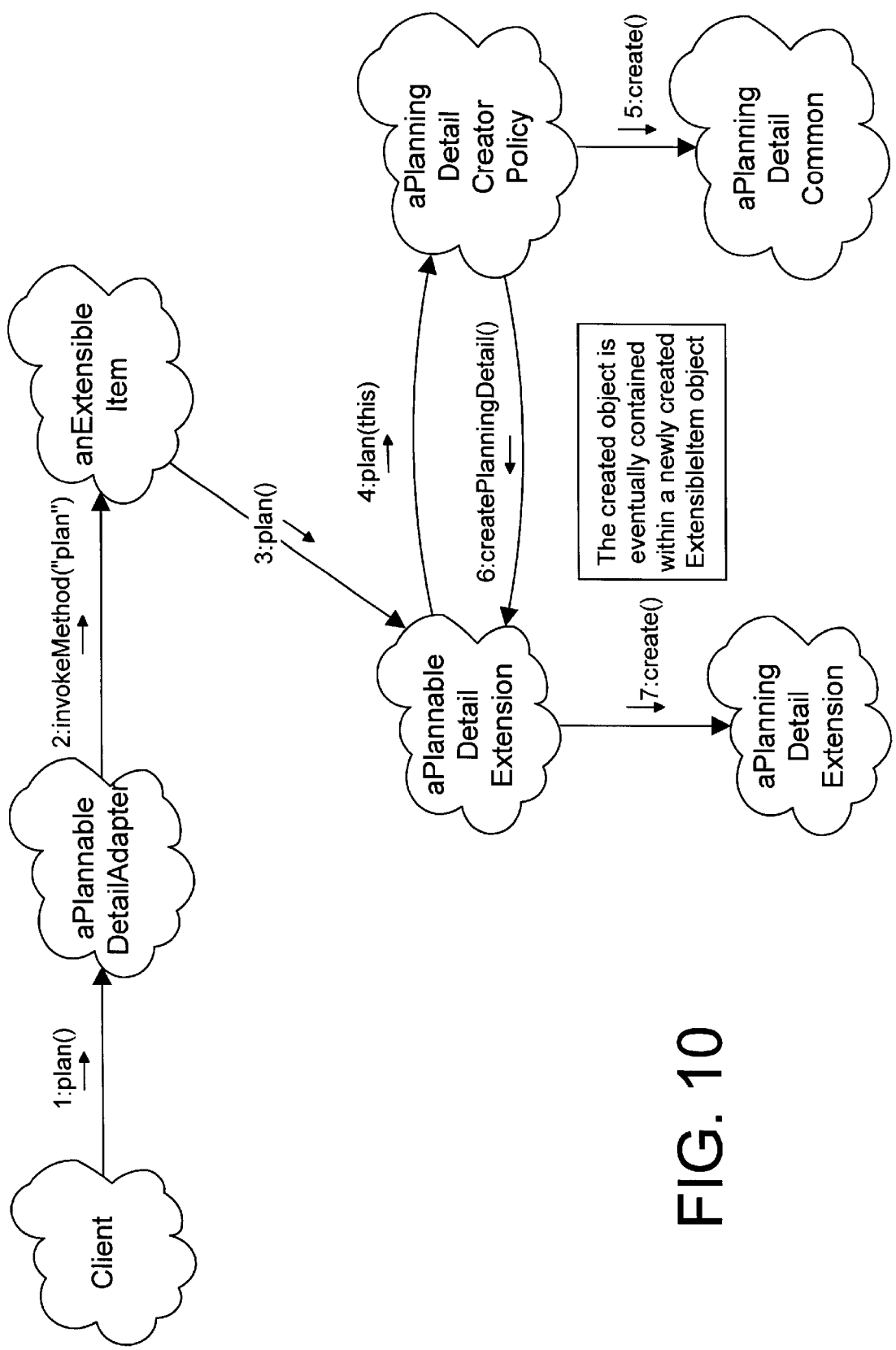
FIG. 10 is an object diagram showing the creation of a planning detail object by process A in FIG. 7.

The class diagrams of FIGS. 8 and 9 may be better understood in conjunction with the object interaction diagram of FIG. 10. The Client object represents any client, whether object oriented or not, that can invoke a plane method on an instance of the PlannableDetailAdapter class. First, the client invokes the plan() method on the object aPlannableDetailAdapter (step 1). In response, aPlannableDetailAdapter invokes the plan() method on anExtensibleItem (step 2). The plan() method is not supported by anExtensibleItem, but must be provided by an appropriate extension. Thus, anExtensibleItem delegates the plan() method to aPlannableDetailExtension (step 3). We assume for the purpose of illustration that aPlannableDetailExtension implements the plan() method call, and in turn invokes the plan() method on aPlanningDetailCreatorPolicy (step 4), which creates a PlanningDetailCommon object (step 5), and then invokes the createPlanningDetail() method on aPlannableDetailExtension (step 6), passing the newly created PlanningDetailCommon object as a parameter. The instance aPlannableExtension then invokes the create() constructor method on the PlanningDetailExtension class (step 7), passing the PlanningDetailCommon object as a parameter, causing an instance aPlanningDetailExtension to be instantiated and eventually contained within a newly created ExtensibleItem object.

The classes, objects and methods that define the processable and processing interfaces and provide coupling between classes in accordance with the present invention collectively comprise a means for coupling processes in an object oriented framework to define a desired processing environment.

The preferred embodiments herein disclose a way for an object oriented framework to define processes without having to specify the relationship between processes. Flow between processes is determined by a user extending the framework to define not only suitable subclasses and methods, but also to define the order of processing the processes. Because the processes are coupled together with appropriate user extensions, the flow of processing is defined by a user without changing the core functions of the framework.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the invention is described herein with specific reference to order processing processes and corresponding classes, one skilled in the art will appreciate that these examples are given by way of illustrating the concepts of the invention, and the present invention is not limited to an order processing system. Virtually any type of processing system may have its processes flexibly coupled together using the concepts taught herein.

We claim:

1. An apparatus comprising:
   at least one processor;
   a memory coupled to the at least one processor;
   an object oriented framework mechanism residing in the memory, the object oriented framework mechanism including:
      a first abstract interface corresponding to processable behaviors for at least one process defined by the framework mechanism, wherein the first abstract interface comprises a core function of the framework mechanism;
      a second abstract interface corresponding to processing behaviors for the at least one process, wherein the second abstract interface comprises a core function of the framework mechanism; and
      a user interface that allows a user to extend the first abstract interface to provide an extended first interface, that allows the user to extend the second abstract interface to provide an extended second interface, and that allows the user to couple the extended first interface to the extended second interface to define at least a portion of the desired processing environment without changing a plurality of core functions of the framework mechanism.

2. The apparatus of claim 1 wherein the extended first interface and the extended second interface comprise user-defined extensions to the first and second abstract interfaces.

3. An apparatus comprising:
   at least one processor;
   a memory coupled to the at least one processor;
   an object oriented framework mechanism residing in the memory, the object oriented framework mechanism including:
      a plurality of classes;
      a first abstract interface corresponding to processable behaviors for at least one process defined by the framework mechanism, wherein the first abstract interface comprises a core function of the framework mechanism;
      a second abstract interface corresponding to processing behaviors for the at least one process, wherein the second abstract interface comprises a core function of the framework mechanism;
      at least one first user-defined extension to the first abstract interface;
      at least one second user-defined extension to the second abstract interface;
      at least one of the plurality of classes implementing the at least one first user-defined extension;
      at least one of the plurality of classes implementing the at least one second user-defined extension;
      a user interface that allows a user to couple the user-defined extension to the second interface in one class to the user-defined extension to the first interface in a different class to define at least a portion of a desired processing environment without changing the core functions of the framework mechanism.

4. The apparatus of claim 3 wherein the user interface assures that the second interface supports the first interface by the second interface implementing the first interface.

5. A method for defining a desired processing environment using an object oriented framework mechanism, the method comprising the steps of:
   providing a plurality of classes defined by the framework mechanism;
   providing a first interface corresponding to processable behaviors for at least one process;
   providing a second interface corresponding to processing behaviors for the at least one process;
   wherein the first and second interfaces are user extensions to abstract interfaces that are core functions of the framework mechanism;
   at least one of the plurality of classes implementing the first interface;
   at least one of the plurality of classes implementing the second interface; and
   a user using a user interface to couple a class implementing the second interface to a class implementing the first interface without changing a plurality of core fuinctions of the framework mechanism.

6. A method for a user to couple together processes defined by a plurality of classes in an object oriented framework mechanism to define a desired processing environment, the method comprising the steps of:
   the framework mechanism providing a first abstract interface corresponding to processable behaviors for at least one process defined by the framework mechanism;
   the framework mechanism providing a second abstract interface corresponding to processing behaviors for at least one process defined by the framework mechanism;
   a user extending the first abstract interface to define a first extended interface;
   a user extending the second abstract interface to define a second extended interface;
   at least one of the plurality of classes implementing the first extended interface;
   at least one of the plurality of classes implementing the second extended interface;
   a user using a user interface to couple the at least one class implementing the second extended interface to a class implementing the first extended interface to define at least a portion of the desired processing environment without changing a plurality of core flnctions of the framework mechanism.

7. A program product comprising:

(A) an object oriented framework mechanism including:

a plurality of classes;

a first abstract interface corresponding to processable behaviors for at least one process defined by the framework mechanism;

a second abstract interface corresponding to processing behaviors for the at least one process;

at least one first user-defined extension to the first abstract interface;

at least one second user-defined extension to the second abstract interface;

at least one of the plurality of classes implementing the at least one first user-defined extension;

at least one of the plurality of classes implementing the at least one second user-defined extension;

a user interface that allows a user to couple the user-defined extension to the second interface in one class to the user-defined extension to the first interface in a different class to define at least a portion of a desired processing environment without changing a plurality of core functions of the framework mechanism; and (B) signal bearing media bearing the framework mechanism.

8. The program product of claim 7 wherein the signal bearing media comprises recordable media.

9. The program product of claim 7 wherein the signal bearing media comprises transmission media.

10. The program product of claim 7 wherein the user interface assures that the second interface supports the first interface by the second interface implementing the first interface.

* * * * *